(12) United States Patent
Guo

(10) Patent No.: US 12,287,061 B2
(45) Date of Patent: Apr. 29, 2025

(54) BENT AND TWISTED MOBILE PHONE SUPPORT

(71) Applicant: Changlai Guo, Shandong (CN)

(72) Inventor: Changlai Guo, Shandong (CN)

( * ) Notice: Subject to any disclaimer, the term of this patent is extended or adjusted under 35 U.S.C. 154(b) by 0 days.

(21) Appl. No.: 18/534,531

(22) Filed: Dec. 8, 2023

(65) Prior Publication Data
US 2024/0102607 A1 Mar. 28, 2024

Related U.S. Application Data

(63) Continuation of application No. PCT/CN2022/098291, filed on Jun. 11, 2022.

(51) Int. Cl.
| | |
|---|---|
| *F16M 11/40* | (2006.01) |
| *F16M 11/10* | (2006.01) |
| *F16M 13/00* | (2006.01) |
| *H04M 1/04* | (2006.01) |
| *F16N 13/00* | (2006.01) |

(52) U.S. Cl.
CPC ............. *F16M 11/40* (2013.01); *F16M 11/10* (2013.01); *F16M 2200/08* (2013.01); *F16N 13/00* (2013.01); *H04M 1/04* (2013.01)

(58) Field of Classification Search
CPC ........ F16M 11/40; F16M 13/00; F16M 11/10; F16M 2200/08; A47G 1/143; A47G 23/043; H04M 1/04; A45F 2200/0516; A45C 2200/15
See application file for complete search history.

(56) References Cited

U.S. PATENT DOCUMENTS

| | | | | |
|---|---|---|---|---|
| 197,554 | A | * | 11/1877 | Johnson |
| 651,215 | A | * | 6/1900 | Timberlake |
| 952,103 | A | * | 3/1910 | Eghigan |
| 1,054,437 | A | * | 2/1913 | Miller .................. A47B 23/042 |
| | | | | 248/465.1 |
| 2,262,240 | A | * | 11/1941 | Koeble ..................... G09F 1/06 |
| | | | | 248/459 |
| 6,672,549 | B2 | * | 1/2004 | Kolb ...................... F16M 13/00 |
| | | | | 248/909 |

FOREIGN PATENT DOCUMENTS

CN  111083266 A * 4/2020 ............. H04M 1/04

* cited by examiner

*Primary Examiner* — Tan Le

(57) ABSTRACT

A bent and twisted mobile phone support, a bendable part of the mobile phone support being made according to the bendability of some articles, has three or more supporting legs, the spacing between the supporting legs of the support can be adjusted by bending the supporting legs; and has two or more support-stop hooks, extending or protruding forward from a planar structure. Because a deformation part twisted or rotated is distributed on a relatively long connecting arm or supporting leg or twisting rod and is not easy to break by repeated bending and twisting, the support-stop hooks do not need to be bent again after being extended by the twisting or rotating of the supporting legs or connecting arms.

3 Claims, 4 Drawing Sheets

BENT AND TWISTED MOBILE PHONE SUPPORT

CROSS-REFERENCE TO RELATED APPLICATIONS

This application is a continuation of PCT/CN2022/098291, filed Jun. 11, 2022 and claims priority of Chinese Patent Application No. 202110650834.7, filed on Jun. 11, 2021, the entire contents of which are incorporated herein by reference.

TECHNICAL FIELD

The present disclosure relates to a support, which is mainly used for placing articles such as a mobile phone, a tablet computer, or a small mirror, falling within the fields of storage and leisure.

BACKGROUND

At present, most of the mobile phone supports on the market are not practical, and phones placed on some of the supports are inconvenient to be charged, and on some of the supports are convenient to be charged, but the supports facilitating the charging of the phones have high cost and large volume after storage.

SUMMARY

Technical Problem

A mobile phone support capable of being bent has been invented, but it cannot be bent repeatedly for many times, and is easy to break with high cost.

Technical Solution

The technical solutions adopted by the present disclosure are as follows. Formed support-stop hooks connected to supporting legs extend out by twisting or rotating the supporting legs according to the bendability of some articles (such as metal aluminium) or the property of the plastic deformation after being subjected to a force, the support-stop hook having one or more curved structures, and having no need to be bent again. A twisted or rotated part is at an upper end of the supporting leg, and the structure of the supporting leg is a long strip shape. In the case of twisting or rotating by 70-90°, deformation parts are not concentrated at a place, but distributed or dispersed in the long strip shape, so that the deformation per unit length is small, and therefore, repeated bending and twisting is not easy to break the deformation parts, with small twisting or rotating forces and easy operations. Specifically, for example, a metal aluminium sheet with a certain thickness is used as the material of the mobile phone support. The support has three or more supporting legs, and the spacing between the supporting legs of the support can be adjusted by bending the supporting legs to cause the supporting legs to become upright and to adjust an inclination angle according to the property of the bendability of the material of the support; and the support has two or more support-stop hooks, and the support-stop hooks can extend or protrude forward from a planar structure by twisting or rotating the supporting legs or connecting arms connected thereto. Since a middle supporting leg of the support needs to be bent forwards or backwards at the top, a twisting rod can be connected to the top, and two ends of the twisting rod are connected to or fixed at two ends of an upper part of the support, so that when the middle supporting leg is bent, the twisting rod will rotate along with the middle supporting leg. The deformation parts are not concentrated but dispersed or distributed in the long strip shape, the deformation per unit length is very small, and therefore, the repeated bending and twisting is labor-saving and not easy to break the deformation parts, and the number of uses is more than 20 times or more. In addition, the supporting strength of the twisting rod or the supporting leg is enhanced after being twisted.

The twisting rod technology in the technical solution can greatly increase the bending and twisting times and prolong the service life, and is more labor-saving and applied in more fields, so the technology needs to be put forward as an independent claim, having the following solutions: an application part of a product is connected to or fixed on a twisting rod, and the application part is accommodated or unfolded by the twisting or bending of the twisting rod, the application part is generally used for supporting an article, hanging an article or fixing an article, and deformation parts of the twisting rod are not concentrated but dispersed or distributed in a long strip shape, with a small deformation per unit length, and is not easy to break by repeated bending and twisting.

The connecting arm or the supporting rod are rotated by about 70-90°, so that the support-stop hook extends out from the support; and after being bent and twisted, there is sufficient space on the upper part of the support-stop hook for placing a mobile phone or other articles on the support-stop hook. In addition, there is no difficulty in bending or twisting the support-stop hook by hand. The twisted and rotated deformation parts are distributed on a relatively long connecting arm or supporting rod, with a small average deformation per unit length, so that repeated bending and twisting is not easy to break the deformation parts, which is labor-saving and easy to store. A delivery state can be completely on about one plane, saving storage space.

Further, the support-stop hook has one or more bent structures or formed hook structures, and does not need to be bent again after being extended by the twisting or rotating of the supporting leg or the connecting arm.

Advantageous Effects

The advantageous effects of the present disclosure are that the support can be stored into a plane shape, which greatly saves space. The support can be made of metal in whole or in large part, which has a higher grade and a longer life than the support made of plastic; and the support has advantageous of a beautiful appearance, convenient storage, unfoldment and use, along life of repeated bending, less harmful to the environment by metal and retrievability. At a very low cost, the mobile phone support can be made of a small amount or inexpensive metallic iron or aluminum or stainless steel, and the mobile phone can be plugged with a charging wire when it is placed on the support.

The unexpected effects of the present disclosure are that repeated bending and twisting is not easy to break the deformation parts, the service life is more than 20 times longer, the end of the support-stop hook does not need to be bent again, and at the same time, such bending and twisting is easy for storage, and a delivery state can be completely on about one plane, which is easy to be placed in a packaging box of the mobile phone, directly providing to consumers. In addition, the twisted or bent parts are self-damped, do not rotate as uncontrollably as the twisting rod, and are advantageous for use when being twisted to a suitable position. Moreover, the manufacturing cost of such a twisted part is much lower than that of the twisting rod, which is also advantageous to produce thinner products.

In addition, the support can be printed with trademarks or manufacturer's logos or other words or drawings, and can also hold such articles as a nameplate (for meeting), a work certificate, a book, a music book, an MP4, a picture album, a small searchlight, and a photo frame. An oversized support can also hold articles such as a notebook computer, and a small kitchen chopping board.

BRIEF DESCRIPTION OF THE DRAWINGS

Reference numerals and denotations thereof: in FIG. 3, 1—right supporting leg; 2—right support-stop hook; 3—backrest and marker block; 4—right connecting arm; 5—middle supporting leg; 6—left supporting leg; 7—left support-stop hook; 8—left connecting arm; and 9—twisting rod.

Figure 1:
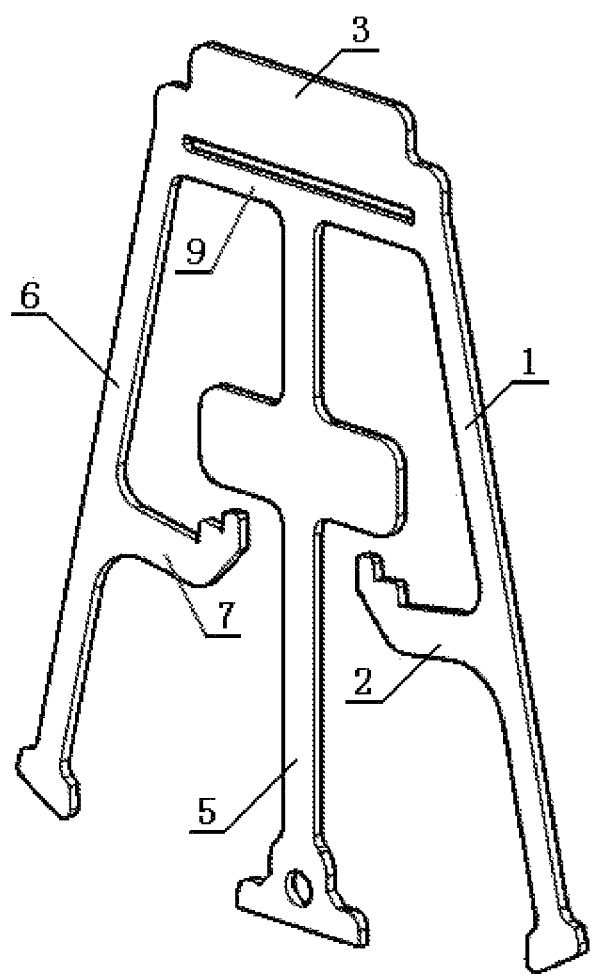
FIG. 1 is a perspective view, substantially in one plane, of a storage state of a design 1 according to the present disclosure.
Figure 3:
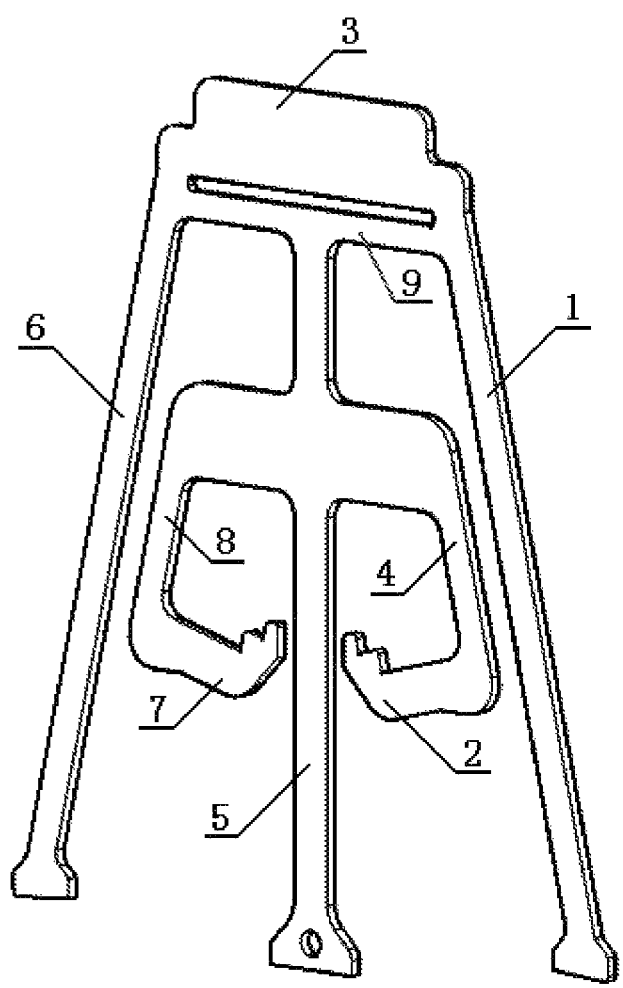
FIG. 3 is a perspective view, substantially in one plane, of a storage state of a design 2 according to the present disclosure.

The reference numerals and denotations in FIG. 1 are the same as in FIG. 3.

Figure 2:
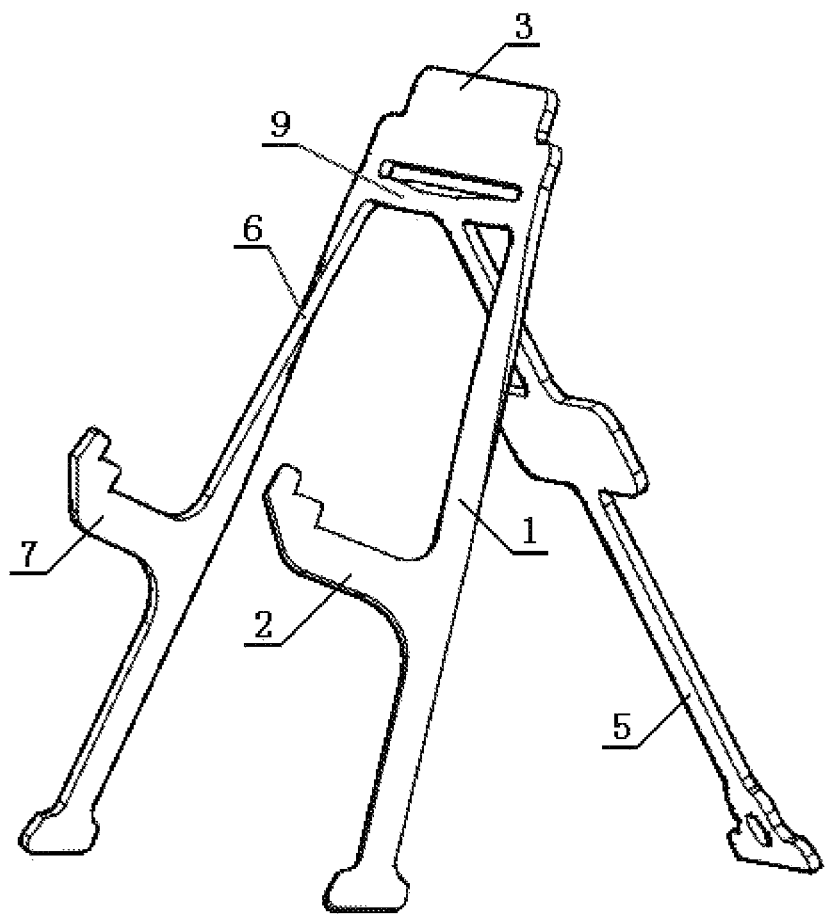
FIG. 2 is a perspective view of a use state of the design 1 according to the present disclosure, which is bent and twisted to an upright position.

The reference numerals and denotations in FIG. 2 are the same as in FIG. 3.

Figure 4:
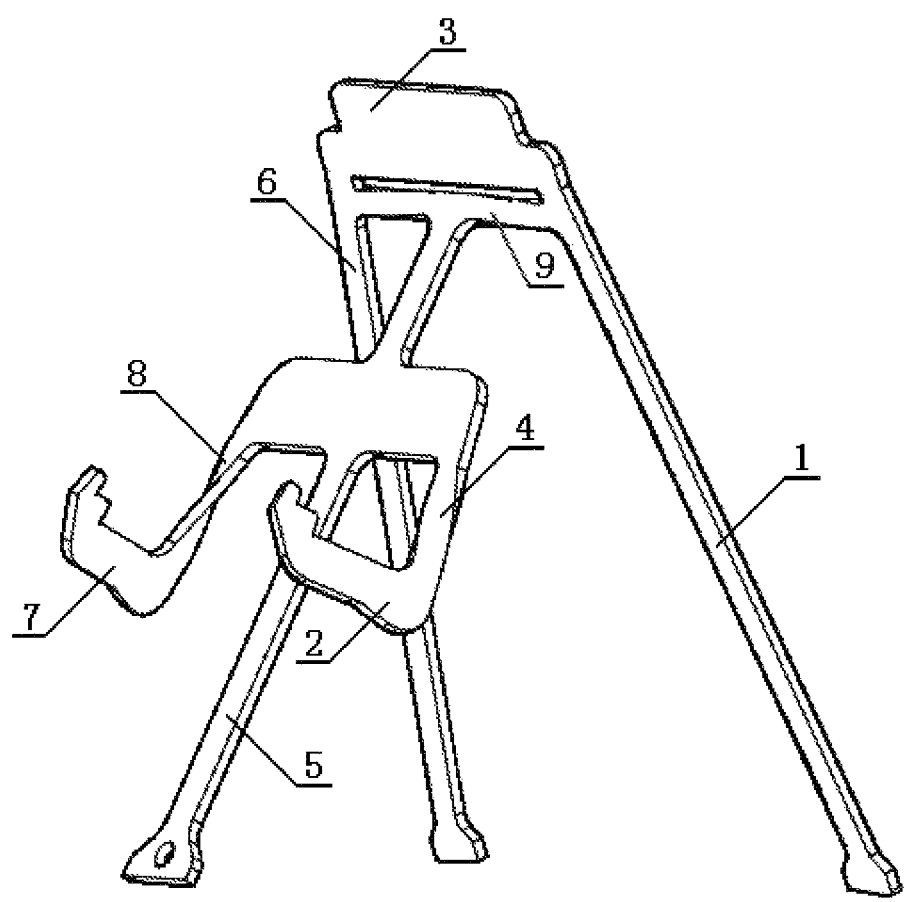
FIG. 4 is a perspective view of a use state of the design 2 according to the present disclosure, which is bent and twisted to an upright position.

The reference numerals and denotations in FIG. 4 are the same as in FIG. 3.

DETAIL DESCRIPTION

Most Preferred Implementation of the Present Disclosure

FIGS. 1 and 2 of the attached drawings are the best models of the present disclosure. A metal aluminum plate is used, and pure aluminum is better, so that it is not easy to break by bending. The aluminum plate is made by laser cutting or die stamping, and a thickness of the metal plate can be about 0.8-1.5 mm. The product can also be made by die casting, which is easy to produce quickly on a large scale. The metal article in FIG. 1 can be changed into the sample in FIG. 2 by bending and twisting by hand, and can be used only needing two steps of bending and twisting.

Implementation of the Present Disclosure

The present disclosure will be further described with reference to the attached drawings and examples.

FIG. 1 is a perspective view, substantially in one plane, of a storage state of a design 1 according to the present disclosure. A right supporting leg 1 and a left supporting leg 6 remain stationary, and a middle supporting leg 5 is bent forwards, so that the design 1 becomes an upright state with three supports. The middle supporting leg 5 is connected to a middle part of a twisting rod 9, during bending, the twisting rod 9 is driven to rotate, and the rotating deformation part is distributed in a long strip shape, with a small deformation per unit length, so repeated bending and twisting is not easy to break the deformation part. A right support-stop hook 2 in FIG. 1 is held and twisted by hand, so that the right supporting leg 1 connected thereto rotates by about 70-90°, and the other left support-stop hook 7 is also twisted in the same direction, so that the left supporting leg 6 connected thereto rotates by about 70-90°; and in this case, the appearance is to be substantially the same as the perspective view in FIG. 2. The mobile phone is placed on the right support-stop hook 2 and the left support-stop hook 7, leaning against a backrest and marker block 3, in this way, the mobile phone can be normally viewed and used. A charging wire can also be plugged in a lower part of the mobile phone, and the mobile phone can be viewed while charging. An inclination angle of the support can be achieved by bending the middle supporting leg to better meet the viewing requirements. The backrest and marker block 3 is not only a backrest, but also plays the role of connecting the three supporting legs, and various marks or trademarks can be printed on to meet the expression requirements of the manufacturer. During the twisting and rotating, the right supporting leg 1 and the left supporting leg 6 have very small deformation per unit length, and are not easy to break by repeated bending and twisting.

FIG. 3 is a perspective view, substantially in one plane, of a storage state of a design 2 according to the present disclosure. The right supporting leg 1 and the left supporting leg 6 remain stationary, and the middle supporting leg 5 is bent forwards, so that the design 2 becomes an upright state with three supports. The middle supporting leg 5 is connected to the middle part of the twisting rod 9, during bending, the twisting rod 9 is driven to rotate, and the rotating deformation part is distributed in a long strip shape, with a small deformation per unit length, so repeated bending and twisting is not easy to break the rotating deformation part. The right support-stop hook 2 in FIG. 3 is held and twisted by hand, so that the right connecting arm 4 connected thereto rotates by about 70-90°, and the other left support-stop hook 7 is also twisted in the same direction, so that the left connecting arm 8 connected thereto rotates by about 70-90°; and in this case, the appearance is to be substantially the same as the perspective view in FIG. 4. The mobile phone is placed on the right support-stop hook 2 and the left support-stop hook 7, leaning against the backrest and marker block 3, in this way, the mobile phone can be normally viewed and used. In other respects, as in the designs of FIG. 2, an inclination angle can also be adjusted, and marks or trademarks can also be printed on. During the twisting and rotating, the right connecting arm 4 and the left connecting arm 8 have small deformation per unit length, and are not easy to break by repeated bending and twisting.

INDUSTRIAL PRACTICABILITY

The support is only a structural member and has a simple structure, which is convenient for industrial mass production.

The above is only the preferred example of the present disclosure, but the protection scope of the present disclosure is not limited to this. Within the technical scope disclosed by the present disclosure, any equivalent substitution or change made by a person familiar with the technical field according to the technical solution and the inventive concept of the present disclosure shall be covered by the protection scope of the present disclosure.

The invention claimed is:

1. A mobile phone support, comprising: a backrest and marker block, a twisting rod, a first supporting leg, a second supporting leg, a third supporting leg, a first support-stop hook and a second support-stop hook, wherein a first end and a second end of the twisting rod in a length direction of the twisting rod are respectively connected to a first end and a second end of the backrest and marker block in a length direction of the backrest and marker block to form a gap between the twisting rod and the backrest and marker block;

the first supporting leg, the second supporting leg and the third supporting leg are disposed on a side of the twisting rod away from the backrest and marker block;

the first supporting leg is connected to the first end of the twisting rod and extends in a direction away from the backrest and marker block;

the second supporting leg is connected to the second end of the twisting rod and extends in the direction away from the backrest and marker block;

the third supporting leg is connected to a middle portion, in the length direction of the twisting rod, of the twisting rod and extends in the direction away from the backrest and marker block;

the first support-stop hook is connected to a middle portion, in a length direction of the first supporting leg, of the first supporting leg; and the first support-stop hook is of a hook structure facing towards the twisting rod;

the second support-stop hook is connected to a middle portion, in a length direction of the second supporting leg, of the second supporting leg; and the second support-stop hook is of a hook structure facing towards the twisting rod;

each of the twisting rod, the first supporting leg and the second supporting leg is in a shape of a sheet;

the mobile phone support is capable of being accommodated on a plane by bending and twisting;

the spacing between the first supporting leg, the second supporting leg and the third supporting leg are capable of being adjusted by bending the first supporting leg, the second supporting leg and the third supporting leg to become upright and to adjust an inclination angle;

the first support-stop hook is capable of being accommodated or unfolded by twisting or rotating the first supporting leg;

the second support-stop hook is capable of being accommodated or unfolded by twisting or rotating the second supporting leg; and the third supporting leg is capable of being accommodated or unfolded by twisting or rotating the twisting rod, wherein in a unfolded state, a deformed portion of each of the first supporting leg, the second supporting leg and the twisting rod is deformed from an end of the deformed portion to another end of the deformed portion in a form of a continuous curl.

2. A mobile phone support, comprising: a backrest and marker block, a twisting rod, a first supporting leg, a second supporting leg, a third supporting leg, a first connecting arm, a second connecting arm, a first support-stop hook and a second support-stop hook, wherein a first end and a second end of the twisting rod in a length direction of the twisting rod are respectively connected to a first end and a second end of the backrest and marker block in a length direction of the backrest and marker block to form a gap between the twisting rod and the backrest and marker block;

the first supporting leg, the second supporting leg and the third supporting leg are disposed on a side of the twisting rod away from the backrest and marker block;

the first supporting leg is connected to the first end of the twisting rod and extends in a direction away from the backrest and marker block;

the second supporting leg is connected to the second end of the twisting rod and extends in the direction away from the backrest and marker block;

the third supporting leg is connected to a middle portion, in the length direction of the twisting rod, of the twisting rod and extends in the direction away from the backrest and marker block;

the first connecting arm and the second connecting arm are both connected to a middle portion, in a length direction of the third supporting leg, of the third supporting leg; and the first connection arm is disposed between the first supporting leg and the third supporting leg, and the second connection arm is disposed between the second supporting leg and the third supporting leg;

the first support-stop hook is connected to the first connecting arm and is of a hook structure facing towards the twisting rod;

the second support-stop hook is connected to the second connecting arm and is of a hook structure facing towards the twisting rod;

each of the twisting rod, the first connecting arm and the second connecting arm is in a shape of a sheet;

the mobile phone support is capable of being accommodated on a plane by bending and twisting;

the spacing between the first supporting leg, the second supporting leg and the third supporting leg are capable of being adjusted by bending the first supporting leg, the second supporting leg and the third supporting leg to become upright and to adjust an inclination angle;

the first support-stop hook is capable of being accommodated or unfolded by twisting or rotating the first connecting arm;

the second support-stop hook is capable of being accommodated or unfolded by twisting or rotating the second connecting arm; and the third supporting leg is capable of being accommodated or unfolded by twisting or rotating the twisting rod, wherein in a unfolded state, a deformed portion of each of the twisting rod, the first connecting arm and the second connecting arm is deformed from an end of the deformed portion to another end of the deformed portion in a form of a continuous curl.

3. A method for using a mobile phone support, the mobile phone support comprising: a backrest and marker block, a twisting rod, a first supporting leg, a second supporting leg, a third supporting leg, a first support-stop hook and a second support-stop hook;

a first end and a second end of the twisting rod in a length direction of the twisting rod being respectively connected to a first end and a second end of the backrest and marker block in a length direction of the backrest and marker block to form a gap between the twisting rod and the backrest and marker block;

the first supporting leg, the second supporting leg and the third supporting leg being disposed on a side of the twisting rod away from the backrest and marker block;

the first supporting leg being connected to the first end of the twisting rod and extending in a direction away from the backrest and marker block;

the second supporting leg being connected to the second end of the twisting rod and extending in the direction away from the backrest and marker block;

the third supporting leg being connected to a middle portion, in the length direction of the twisting rod, of the twisting rod and extending in the direction away from the backrest and marker block;
the first support-stop hook being connected to a middle portion, in a length direction of the first supporting leg, of the first supporting leg and being of a hook structure facing towards the twisting rod;
the second support-stop hook being connected to a middle portion, in a length direction of the second supporting leg, of the second supporting leg and being of a hook structure facing towards the twisting rod;
each of the twisting rod, the first supporting leg and the second supporting leg each being in a shape of a sheet;
the mobile phone support being capable of being accommodated on a plane by bending and twisting; and
the method comprising:
twisting or rotating the first supporting leg to accommodate or unfold the first support-stop hook;
twisting or rotating the second supporting leg to accommodate or unfold the second support-stop hook; and
twisting or rotating the twisting rod to accommodate or unfold the third supporting leg,
wherein in a unfolded state, a deformed portion of each of the first supporting leg, the second supporting leg and the twisting rod is deformed from an end of the deformed portion to another end of the deformed portion in a form of a continuous curl.

\* \* \* \* \*